Dec. 1, 1964

D. D. GROVES 3,159,278

SORTING APPARATUS

Filed March 14, 1962

INVENTOR.
DALE D. GROVES
BY
ATTY.

Dec. 1, 1964  D. D. GROVES  3,159,278
SORTING APPARATUS
Filed March 14, 1962  4 Sheets-Sheet 2
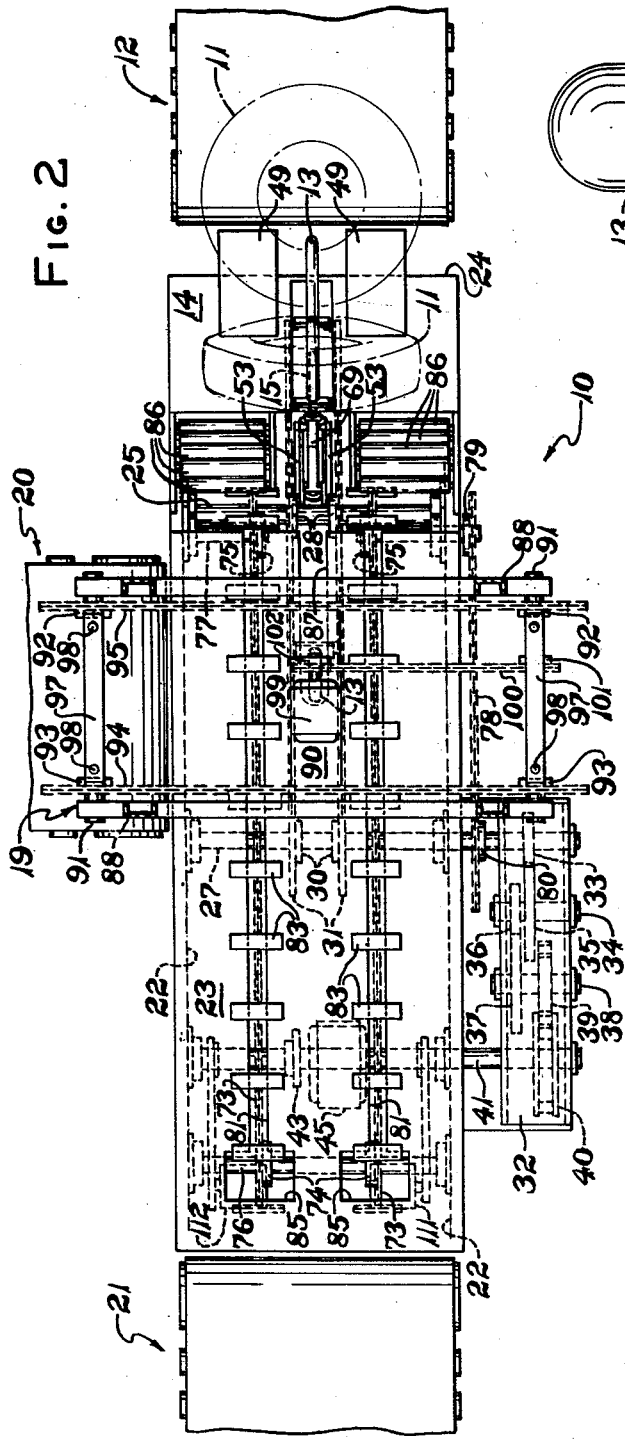
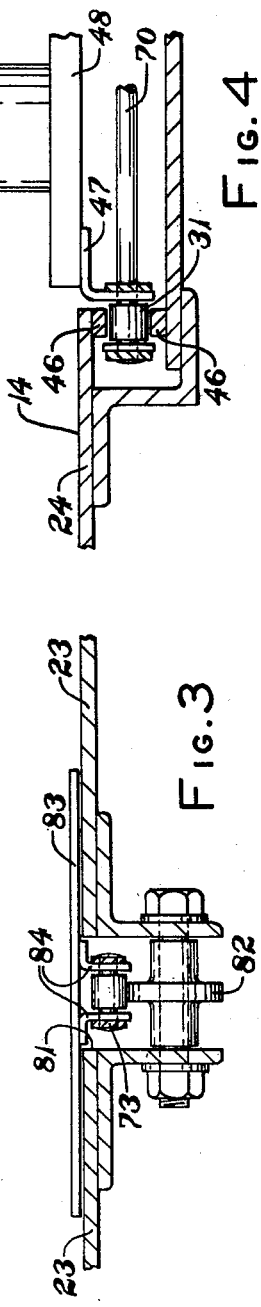
INVENTOR.
DALE D. GROVES
BY
ATTY.

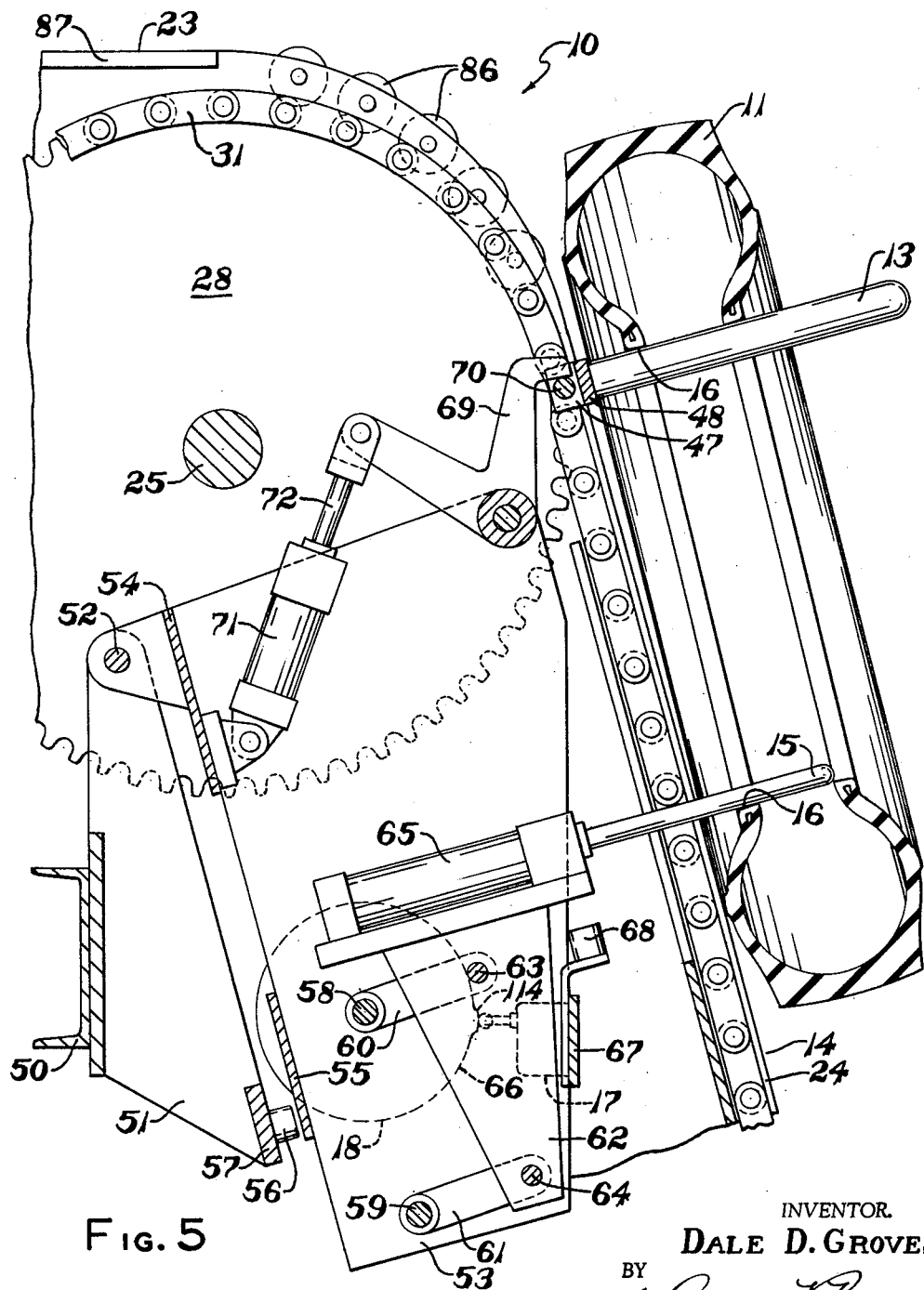

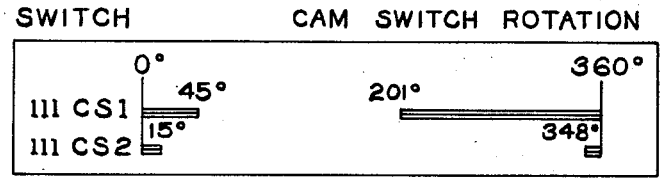
Fig. 7
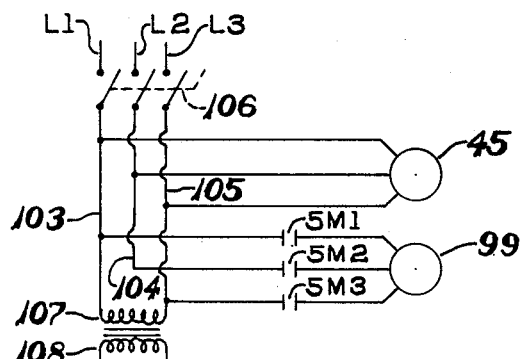
Fig. 6
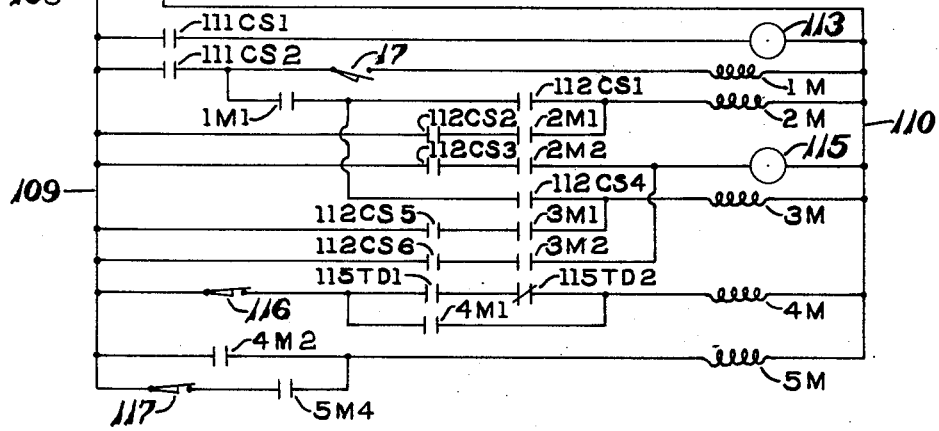
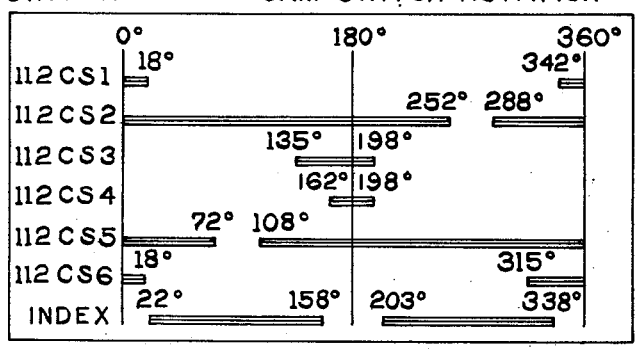
Fig. 8
INVENTOR.
DALE D. GROVES
BY
ATTY.

United States Patent Office 3,159,278
Patented Dec. 1, 1964

3,159,278
SORTING APPARATUS
Dale D. Groves, Akron, Ohio, assignor to The B. F. Goodrich Company, New York, N.Y., a corporation of New York
Filed Mar. 14, 1962, Ser. No. 179,594
5 Claims. (Cl. 209—90)

This invention relates to the sorting of annular articles, and, more particularly, to the sorting of rubber vehicle tires in accordance with the inside diameter of their central bead opening. The problem of sorting tires in a manufacturing plant producing several sizes, and several types for each size, has been a difficult, time consuming and costly one in their manufacture and inventory when performed by the methods and apparatus available prior to the present invention.

The human errors caused by misjudgment or fatigue became particularly prevalent when the person doing the sorting was called up to sort tires of different bead openings and many visually similar but actually different constructions and configurations for each bead opening size. Furthermore, as tire production increased through the years a greater number of sorters were required for this time consuming operation at a consequently greatly increased labor cost.

It therefore became incumbent upon those concerned with these problems to devise an apparatus whereby tires could be quickly and automatically sorted according to the size of their bead openings without regard to the tire width or configuration. Such sorting was attempted in many ways. For instance, code impressions were molded in the tire sidewalls and were "read" by switching actuating fingers which engaged the impressions as the tire was moved past a sorting station. Problems of expensive mold inserts, alignment of the tire when passing the sorting station, and positioning of the switch actuating fingers for engagement with tires of mixed widths were such as to render this system impractical and unreliable. Many other tire coding expedients were attempted in which the tire bead wires were magnetized in coded fashion, and radioactive materials were imbedded in the tire in coded fashion, either of which would be sensed by appropriate code "readers" at sorting stations. As with the coded impression system, these methods were found too costly and unreliable to warrant their use. It became increasingly apparent that to accomplish tire sorting effectively and inexpensively an apparatus was needed that could automatically and directly gauge the inside diameter of the tire bead opening.

It is an object of this invention therefore, to provide a tire sorting apparatus which will quickly and automatically gauge the inside diameter of a tire bead opening.

It is another object of this invention to provide a tire sorting apparatus which will sense the inside diameter of a tire bead opening and sort tires into one or more groups each having the same bead opening diameter.

It is a further object of this invention to provide a tire sorting apparatus which will move tires along a given path, sense the inside diameter of the tire bead opening as the tire is moved along said path, and at given subsequent stations along said path discharge said tires from said apparatus in accordance with the diameter of said tire bead opening.

It is a still further object of this invention to provide an apparatus as described in the preceding paragraph wherein said tires are discharged at said stations in response to the prior sensing of their bead opening diameter.

Other objects and advantages to be gained through the use of the present invention will be apparent to those skilled in the art to which it pertains from the following detailed description of a preferred embodiment of the invention and from the drawings froming a part of this application in which:

FIG. 2 is a plan view of the apparatus as shown in FIG. 1;

FIG. 3 is a side elevational view, partially in section, taken along line 3—3 of FIG. 1, illustrating the mounting of the tire conveyor chain and conveying plates;

FIG. 4 is a view, partially in section, taken along line 4—4 of FIG. 1, illustrating the mounting of one of the tire reference pins;

FIG. 5 is a side elevational view, partially in section, and to an enlarged scale of a portion of FIG. 1, showing the mechanical portions of the tire size sensing assembly;

FIG. 6 is a schematic, across-the-line wiring diagram of the electrical control circuit of the apparatus;

FIG. 7 is a timing chart of one of the cam switches which actuates a portion of the circuit of FIG. 6; and FIG. 8 is a timing chart of another of the cam switches which actuates another portion of the circuit of FIG. 6.

Figure 1:
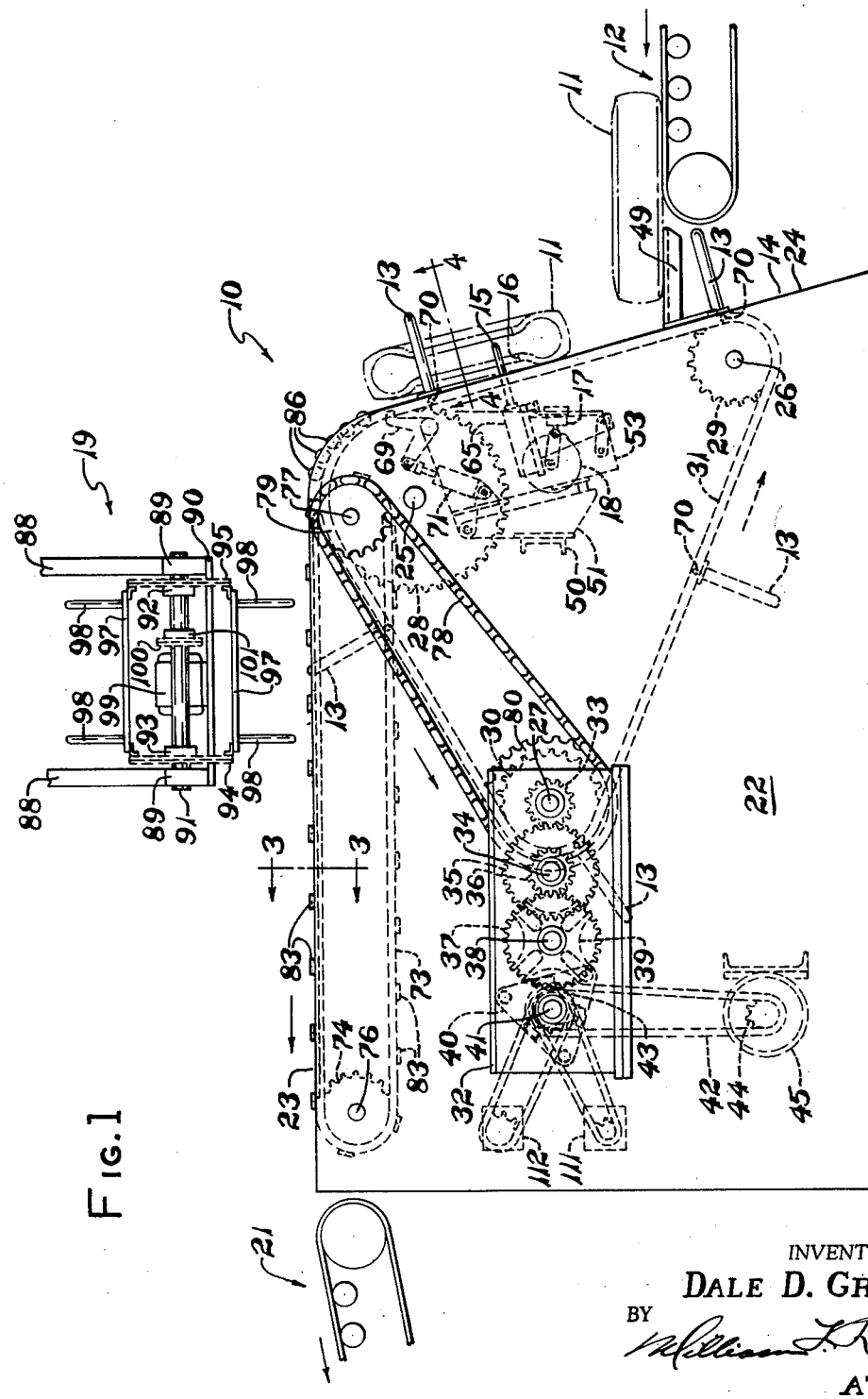
FIG. 1 is a somewhat schematic front elevational view of the apparatus with its associated tire conveyors.

The tire sorting aparatus 10 of the present invention receives a tire 11 from a conveyor 12, lifting it up by means of one of several reference pins 13 which move about the apparatus 10. The pin 13 moves the tire 11 up an incline 14 during which time a register pin 15 is inserted into the central bead opening of the tire 11 for engagement with the inner bead surface 16 at a point diametrically opposite the point of the engagement of the reference pin 13. When the tire 11 reaches an indexed reference position as shown in FIG. 5, the inside diameter of the bead opening of the tire 11 is determined by the vertical displacement of register pin 15. This displacement is read by a limit switch 17 which senses the rotation of a cam 18 caused by the displacement of register pin 15. The actuation of limit switch 17 sets up the electrical memory circuits in the circuit shown in FIG. 6 to cause the tire transfer assembly 19 to discharge the tire 11 in a direction taken by all tires having the same bead opening diameter as tire 11 on a lateral takeaway conveyor 20. All other tires are carried through the appparatus and discharged to a takeaway conveyor 21.

The apparatus 10 comprises front and rear vertical support plates 22, a slotted upper horizontal cross support 23 and a slotted inclined side support 24. Rotatably journalled between plates 22 are parallel shafts 25, 26 and 27. Mounted near the center of shaft 25 are a pair of large sprockets 28. A smaller pair of sprockets 29 are mounted on shaft 26, and a similar pair of sprockets 30 are mounted near the center of shaft 27. Passing about sprocket 28, 29 and 30 are a pair of parallel chains 31. Mounted on the front of the apparatus 10 on one of the plates 22 is a gear box 32. One end of shaft 27 projects into box 32 and has a spur gear 33 mounted thereon. Journalled in box 32 parallel to shaft 27 is a rotatable shaft 34 having a spur gear 35 mounted thereon and engaged with gear 33. A second, smaller spur gear 36 is mounted on shaft 34 and is engaged with a large spur gear 37 mounted on a shaft 38 rotatably journalled in gear box 32. Also mounted on shaft 38 is a four position Geneva gear 39 which is driven by a Geneva gear driver 40 mounted on a shaft 41 journalled in gear box 32 and extending to the rear support plate 22 where it is also journalled. Shaft 41 is rotated by means of a chain 42 passing about a sprocket 43 on shaft 41 and a sprocket 44 mounted on the output shaft of a suitable source of power, such as a motor 45, which is mounted between supports 22. Thus, as motor 45 is operated, chains 31 are caused to move about sprocket 28, 29 and 30 intermittently.

As seen in FIG. 4, when passing up the incline 14, chains 31 are guided in guide bearings 46 mounted beneath side support 24. At five equally spaced positions on each chain 31 angle brackets 47 are mounted. Cross supports 48 are mounted between chains 31 on brackets 47 and a reference pin 13 is centrally mounted on each bracket 47 perpendicularly thereto. It will be seen that as a tire 11 is delivered to the apparatus 10 by conveyor 12, it is supported by a fork member 49 horizontally mounted on side support 14, and as chains 31 are moved pin 13 will enter the central bead opening of the tire 11 and move the tire up incline 14.

Mounted on a horizontal channel beam 50 mounted between supports 22 are a pair of spaced, generally triangularly shaped vertical plates 51, only one of which is seen in FIG. 5. Pivotally mounted on each plate 51, as at 52, is a plate 53. Plates 53 are joined for joint pivotal movement by cross braces 54 and 55. A cushion 56 of rubber or other suitable material is mounted on a cross brace 57 mounted between the lower ends of plates 51 for contact with brace 55. Mounted between plates 53 are a pair of parallel, vertically spaced rods 58 and 59 to which are pivotally mounted pairs of links 60 and 61, respectively. Links 60 and 61 pivotally support a generally triangularly shaped member 62 by means of pivot rods 63 and 64 respectively. The distance between rods 58 and 59, and the distance between rods 63 and 64 are equal. The length of links 60 and 61 are likewise equal. Thus, a parallelogram is defined by the centers of rods 58, 59, 63 and 64 regardless of the position of plate 62. Mounted on the upper end of plate 62 is a single acting, spring return air cylinder 65 having a piston rod the outer end of which forms register pin 15. Rotatably mounted on rod 58 and attached to links 60 for movement therewith is a cam disc 18 having a camming surface 66. Mounted on a cross brace 67 between plates 53 is limit switch 17 engaged with camming surface 66. A cushion member 68 is mounted above brace 67 to cushion the downward movement of cylinder 65. Pivotally mounted between the upper ends of plates 53 at a point intermediate its ends is a pawl lever member 69 which is engageable with a rod 70 mounted beneath cross bar 48 and between brackets 47 on chains 31. Pawl member 69 is moved by means of a single acting, spring return air cylinder 71 pivotally mounted on cross brace 54 and having a piston rod 72, the outer end of which is pivotally mounted to one end of pawl member 69. Pawl member 69 performs an important function by engaging rod 70 as reference pin 13 is moved to the desired index point. Due to tension changes in chains 31 or to normal wear of the indexing components, pin 13 may stop beyond or short of the desired index point. When so engaged, while held rigidly in position by air cylinder 71, continued movement of rod 70 will cause plates 53 to pivot counterclockwise about pivot points 52 and thus maintain the desired "at rest" reference distance between register pin 15 and reference pin 13 regardless of slight deviation from the desired index point by pin 13.

A horizontal conveyor system is mounted on and beneath upper support plate 23. This system comprises a pair of parallel chains 73 trained about pairs of sprockets 74 and 75 mounted on shafts 76 and 77, respectively, which are journalled between support plates 22. Shaft 77 is driven by means of a drive chain 78 which is trained about a sprocket 79, mounted on an end of shaft 77 projecting through front support plate 22, and a sprocket 80 on shaft 27. Parallel slots 81 are formed in upper support plate 23 through which the chains 73 are trained. At spaced points beneath slots 81 chain support rollers 82 are mounted, as seen only in FIG. 3. Conveyor plates 83 are mounted on the outer surface of chains 73 by means of angle brackets 84, and slide along on upper support plate 23. In plate 23 at the discharge end of chains 73 slots 81 are enlarged as at 85 to provide clearance for plates 83. At the loading end of chains 73 and to either side of sprockets 28 are mounted a plurality of rollers 86 on which the tire 11 may be carried as reference pin 13 moves the tire 11 toward plates 83. It will be seen that due to the difference in sprocket sizes chains 73 move at a slightly greater speed than chains 31. Thus, as the tire 11 reaches the conveyor plate 83 it will move away from reference pin 13 so that the pin does not crush the tire as it descends through a slot 87 formed in upper plate 23.

Suspended above upper plate 23 by means of four vertical supports 88, attached to the ceiling not shown, is the tire transfer assembly 19. Horizontal braces 89 support a horizontal platform 90 between supports 88. Journalled between adjacent pairs of supports 88 are rotatable shafts 91. Mounted at opposite ends of each shaft 91 are sprockets 92 and 93. A chain 94 passes about sprockets 93 and a similar chain 95 passes about sprockets 92. Four angle brackets 96 on each chain 94 and 95 provide support for four cross members 97 mounted thereon. On each member 97 there are mounted a pair of tire engaging fingers 98. A motor 99 is mounted on platform 90 and is in driving engagement with one of the shafts 91 by means of a chain 100 passing about a sprocket 101 mounted on one shaft 91 and another sprocket 102 mounted on the output shaft of motor 99.

Control Circuit and Machine Operation

The control circuit for governing the operation of the apparatus 10 is operable by alternating current. It is to be understood that the conventional devices such as current limiting resistances, overload devices, direct current motor breaking devices, grounds and the like have been omitted for the sake of clarity in the presentation.

It will be seen that alternating current power is supplied to the circuit through supply lines L1, L2 and L3, which are connected to a source of electrical power, not shown, of the 3-phase alternating current type. Power lines L1, L2 and L3 are connectable to the main motor circuit lines 103, 104 and 105, respectively, by a triple pole, single throw switch 106. Lines 103 and 105 are connected to the primary coil 107 of a stepdown transformer. Secondary coil 108 of this transformer has its terminals connected to power supply lines of bus bars 109 and 110 for the control circuit.

The electrical circuit of the apparatus will be better and more readily understood from the following detailed description of the operation of the entire apparatus.

It should be noted that a pair of cam switches 111 and 112 mounted between supports 22 have their drive shafts connected to shaft 41 in such a manner that the shaft of switch 112 makes one revolution for each revolution of shaft 41 while the shaft of switch 111 makes two revolutions for one revolution of shaft 41. The operator commences operation by closing switch 106 to energize the main motor circuit and control circuit. Thus, when switch 106 is closed motor 45 is energized to turn shaft 41 and through associated components cause chains 31 to move intermittently about their respective sprockets. Movement of chains 31 causes one of the reference pins 13 to pick up a tire 11 from fork members 49 and move up incline 14 to an index position. As pin 13 nears the index dwell point contacts 111CS1 of switch 111 close to energize a two way valve 113 shown schematically only in FIG. 6. Valve 113 directs air under pressure to single acting air cylinders 65 and 71 causing piston rod 72 and register pin 15 to move outward from their respective cylinders. Pawl 69 is positioned by piston rod 72 to engage rod 70 as discussed previously. Register pin 15 is projected by cylinder 65 into the central bead opening of the tire 11, and as the tire is carried upward pin 15 engages the inner bead surface 16 at a point opposite that engaged by pin 13. As the tire 11 continues upward register pin 15 is vertically displaced from its initial position, causing plate 62 to pivot about rods 58 and 59. As it does so, cam 18 rotates until limit switch 17 is energized by engagement with a high spot 114 on the caming surface 66, which, for purposes of discussion, will be assumed to indicate a 13 inch tire. It will be apparent that for sizes larger than 13 inches cam 18 will not rotate sufficiently to energize switch 17. The Geneva drive allows the pin 13 to cease movement at this point and during this "dwell" contacts 111CS2 of switch 111 close to energize a relay 1M. Energization of relay 1M causes its contacts 1M1 to close and cam switch 112 causes its contacts 112CS1 to close to energize relay 2M. Energization of relay 2M causes its contacts 2M1 and 2M2 to close and switch 112 closes its contacts 112CS2, thus sealing the circuit containing relay 2M. Contacts 111CS1 and 111CS2 are now opened, pin 15 and pawl 69 retract and the machine now leaves the indexing "dwell" and makes one index to move the tire 11 to a point on conveyor plates 83 just beneath transfer conveyor 19. Switch contacts 112CS3 of switch 112 now close to energize a time delay relay 115 having normally open contacts 115TD1 which close instantly, and normally closed contacts 115TD2 which are opened approximately one second after contacts 115TD1 close. Relay 4M is energized, causing its contacts 4M1 and 4M2 to close. Closure of contacts 4M1 before contacts 115TD2 opens allows relay 4M to remain energized. Closure of contacts 4M2 energize relay 5M closing its contacts 5M1, 5M2, 5M3 and 5M4. Closure of contacts 5M1, 5M2 and 5M3 energizes motor 99 which causes fingers 98 to remove the tire 11 from conveyor plates 83 onto a take-away conveyor 20. As the chain 94 begins to move, a dog, not shown, mounted thereon opens normally closed limit switch 116 to deenergize its circuit and relay 4M whose contacts all open. As chain 94 continues movement limit switch 116 is disengaged by the dog and again closes. After the chains 94 and 95 have moved a predetermined distance, sufficient to discharge tire 11 from the apparatus, the dog on chain 94 contacts closed limit switch 117 opening it to deenergize relay 5M and stop motor 99. In the next transfer cycle the dog disengages limit switch 117 when chain 94 begins to move, allowing the switch to return to its normally closed position.

It will be seen that while the tire 11 is being transferred to takeaway conveyor 20 another tire 11 may be being gauged by pin 13. If this is also a 13 inch tire, as was the preceding tire, limit switch 17 is closed to energize a somewhat parallel circuit to that utilized by the prior tire. Thus, contacts 112CS4 of switch 112 close to energize relay 3M and close its contacts 3M1 and 3M2. Contacts 112CS5 close to "seal" the relay 3M after contacts 1M1 open due to opening of switch 17 and thus "remember" the tire size. Contacts 112CS6 close to energize relay 115 and operate its related contacts at the proper time, as before, to energize relay 4M and 5M to operate the tire transfer assembly 19 as before. At this time the previously used circuit is being used to store data from the next tire being gauged.

It will be seen that if the tire 11 has a bead opening greater than 13 inches limit switch 17 will not be energized and the transfer assembly will not be actuated when the tire reaches a point beneath it. The tire will therefore be discharged onto the takeaway conveyor 21.

It will be apparent that by the simple addition of similar electrical switching and memory circuits in parallel with the present circuit additional transfer assemblies such as 19 can be positioned over the apparatus 10 to increase its sorting capabilities for any number of different tire sizes.

Although the apparatus has been described with reference to a specific embodiment thereof, it will be understood by those skilled in the art to which it pertains that further modifications and refinements within the spirit and scope of the appended claims may be made thereto.

I claim:

1. Apparatus for sorting elastomeric vehicle tires in accordance with the inside diameter of the annular bead surface of each of said tires, comprising at least one reference pin movably mounted on said apparatus for engagement with the said bead surface of a tire and for movement to and from a reference position on said apparatus, means to intermittently move said reference pin to and from said reference position whereby said reference pin is held stationary at said reference position for a period of time, a pair of links of equal length each pivotally mounted on said apparatus by an end thereof, a movable support member, means pivotally mounting the other end of each of said links to said support member whereby the said links remain parallel to one another as said support member is moved, means limiting the movement of said support member under the force of gravity in one direction, a register pin axially movably mounted on said support member, means to move said register pin axially to and from a position for engagement with said bead surface at a location diametrically opposite that of the said engagement by the reference pin, at least one tire discharge means operable to discharge tires having a given diameter of said bead surface, means to discharge tires not discharged by said tire discharge means, means movable in response to pivotal movement of one of said links to energize said sensing means.

2. Apparatus for sorting elastomeric vehicle tires in accordance with the inside diameter of the annular bead surface of each of said tires, comprising a plurality of reference pins each for engagement with the said bead surface of a tire; mounting means mounting said reference pins in equally spaced relationship for movement in a circuitous path on said apparatus; means to intermittently move said mounting means whereby said reference pins are sequentially moved to and from a reference position along said path and whereby said reference pins are each sequentially held stationary at said reference position for a period of time; a tire gauging assembly mounted on said apparatus adjacent said path at said reference position, said assembly further comprising a frame member pivotally mounted to said apparatus, means mounted on said frame member to pivotally move said frame member in response to movement of each of said reference pins as each said reference pin approaches said reference position, a support member, a register pin movably mounted on said support member, means to move said register pin to and from a position for engagement with said bead surface at a point diametrically opposite that of the said engagement by a reference pin; means rockably mounting said support member for movement with reference to said frame member whereby the position of said support member may be translated with reference to said frame member while maintaining the longitudinal axis of said register pin parallel to the locus of its position before being moved, at least one tire discharge means operable to discharge tires of a given diameter of said bead surface; sensing means to operate said tire discharge means in response to predetermined incremental movement of said support member with reference to said frame member; and means to move said tire from engagement with said reference pin to said tire discharge means.

3. Apparatus for sorting pneumatic tires having a given bead diameter from other tires having different bead diameters, comprising a reference pin movably mounted on said apparatus, said reference pin having a longitudinal center line, means to move said reference pin into engagement with a bead surface of said tire, a register pin movably mounted on said apparatus for movement parallel to the longitudinal center line of said reference pin, means to move said register pin to a position inside the bead opening, means to move said reference pin relative to said register pin to move a tire thereon into engagement with said register pin at a region of the bead surface away from the region engaged by said reference pin and to displace said register pin translationally as a result of said engagement, a first tire discharge means operable upon actuation to receive from said reference pin and discharge said tire with said given bead diameter in one direction from said apparatus, means to move said other tires in another direction from said apparatus, and means operable in response to said translational movement of said register pin to actuate said first tire discharge means.

4. A tire sorting apparatus comprising a discharge conveyor, a transfer means operative to transfer tires seriatim from a tire receiving station to said discharge conveyor, discharge means mounted adjacent said discharge conveyor for diverting tires from said discharge conveyor upon actuation thereof, said transfer means having a plurality of spaced reference pins wherein each of said pins is adapted to pick up a tire at such receiving station in seriatim order to transfer to said discharge conveyor, movable gauging means cooperative with at least one of said reference pins to gauge an inner diameter opening of a tire held by said one reference pin in a predetermined position, and said gauging means being operative to selectively actuate said discharge means upon determination of a certain size of inner diameter opening of a tire.

5. A tire sorting apparatus comprising a transfer conveyor operative between a receiving conveyor and a discharge conveyor means, said transfer conveyor having a plurality of spaced reference pin means wherein each reference pin means is operative to engage a rim of a tire positioned at such receiving conveyor for transferring such tire to such discharge conveyor means, means for intermittently moving said transfer means and said reference pin means, gauging means mounted on said apparatus and movable in timed relation with said reference pin means, said gauging means cooperative with prepositioning of each of said register reference pin means in a seriatim order at a predetermined dwell location after one of such intermittent movements to perform a gauging operation, and register pin means coperative with said gauging means to operate said discharge conveyor means into a sorting operation.

References Cited by the Examiner
UNITED STATES PATENTS

| | | | |
|---|---|---|---|
| 2,216,795 | 10/40 | Aller | 209—88 |
| 2,734,627 | 2/56 | Shields | 209—88 |
| 2,785,799 | 3/57 | Esken | 209—88 |
| 2,796,986 | 6/57 | Rajchman | 209—111.5 X |
| 3,069,965 | 12/62 | Strzala | 209—111.5 |

SAMUEL F. COLEMAN, *Acting Primary Examiner.*

HUGO O. SCHULZ, *Examiner.*

UNITED STATES PATENT OFFICE
CERTIFICATE OF CORRECTION

Patent No. 3,159,278  December 1, 1964

Dale D. Groves

It is hereby certified that error appears in the above numbered patent requiring correction and that the said Letters Patent should read as corrected below.

Column 2, line 1, for "froming" read -- forming --; line 22, for "aparatus" read -- apparatus --; column 6, lines 24 and 25, for "means movable in response to pivotal movement of one sensing means to operate said tire discharge means, and" read -- sensing means to operate said tire discharge means, and means movable in response to pivotal movement of one --; column 8, line 13, for "coperative" read -- cooperative --.

Signed and sealed this 10th day of August 1965.

(SEAL)
Attest:

ERNEST W. SWIDER
Attesting Officer

EDWARD J. BRENNER
Commissioner of Patents